United States Patent [19]
Jordil

[11] Patent Number: 5,977,781
[45] Date of Patent: *Nov. 2, 1999

[54] CAPACITIVE MEASURING DEVICE

[75] Inventor: Pascal Jordil, Ecoteaux, Switzerland

[73] Assignee: Brown & Sharpe Tesa S.A., Renens, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/659,671

[22] Filed: Jun. 5, 1996

[30] Foreign Application Priority Data

Jun. 7, 1995 [EP] European Pat. Off. .............. 95810372

[51] Int. Cl.⁶ .................................................. G01R 27/26
[52] U.S. Cl. ......................... 324/658; 324/690; 324/686; 324/662; 340/870.37
[58] Field of Search ................................... 324/725, 662, 324/660, 686, 658; 340/870.37

[56] References Cited

U.S. PATENT DOCUMENTS

| | | | |
|---|---|---|---|
| 3,777,257 | 12/1973 | Geisselmann | 324/663 |
| 4,543,526 | 9/1985 | Burckhardt | 324/725 |
| 4,878,013 | 10/1989 | Andermo | 324/61 |
| 5,053,715 | 10/1991 | Andermo | 324/662 |
| 5,068,653 | 11/1991 | Klingler | 340/870.37 |
| 5,225,830 | 7/1993 | Andermo et al. | 341/13 |
| 5,239,307 | 8/1993 | Andermo | 340/870 |
| 5,574,381 | 11/1996 | Andermo | 324/660 |
| 5,586,042 | 12/1996 | Pisau et al. | 364/482 |
| 5,731,707 | 3/1998 | Andermo | 324/660 |

FOREIGN PATENT DOCUMENTS

| | | |
|---|---|---|
| 0053091 | 6/1982 | European Pat. Off. . |
| 0248165 | 12/1987 | European Pat. Off. . |
| 0400626 | 12/1990 | European Pat. Off. . |
| 0184584 | 9/1991 | European Pat. Off. . |
| 0413922 | 9/1991 | European Pat. Off. . |
| 0537800 | 4/1993 | European Pat. Off. . |
| 0404980 | 5/1993 | European Pat. Off. . |
| 0622612 | 11/1994 | European Pat. Off. . |
| 4237652-A1 | 5/1994 | Germany .............................. 324/662 |
| 59-23218 | 6/1984 | Japan . |
| 62-235504 | 10/1987 | Japan . |
| 62-242816 | 10/1987 | Japan . |
| 648 929 | 4/1985 | Switzerland . |

Primary Examiner—Josie Ballato
Assistant Examiner—Thomas Valone
Attorney, Agent, or Firm—Jacobson, Price, Holman & Stern, PLLC

[57] ABSTRACT

A capacitive measuring device has a scale and a transducer, both provided with an array of electrodes. The position of the transducer with respect to the scale is determined in a processing circuit by evaluating the capacitances formed between the two arrays. These capacitances vary periodically as a function of the relative position of the transducer. The scale electrodes are spaced by a pitch ($\lambda$). In order to increase the resolution, the transducer electrodes occupy possible initial positions spaced by an elementary interval (P) which is a submultiple of the pitch ($\lambda$). The transducer electrodes are thus divided into N groups according to the initial position which they occupy. In order to compensate for manufacturing imprecisions of periodic type, the succession of transducer electrodes is highly non-periodic. To this end, the set intervals ($I_j$) occupied by the sets of successive electrodes interpenetrate, and the number of unoccupied possible initial position between the bundles of electrodes is variable. A set of electrodes is a set composed of one electrode of each group.

21 Claims, 4 Drawing Sheets

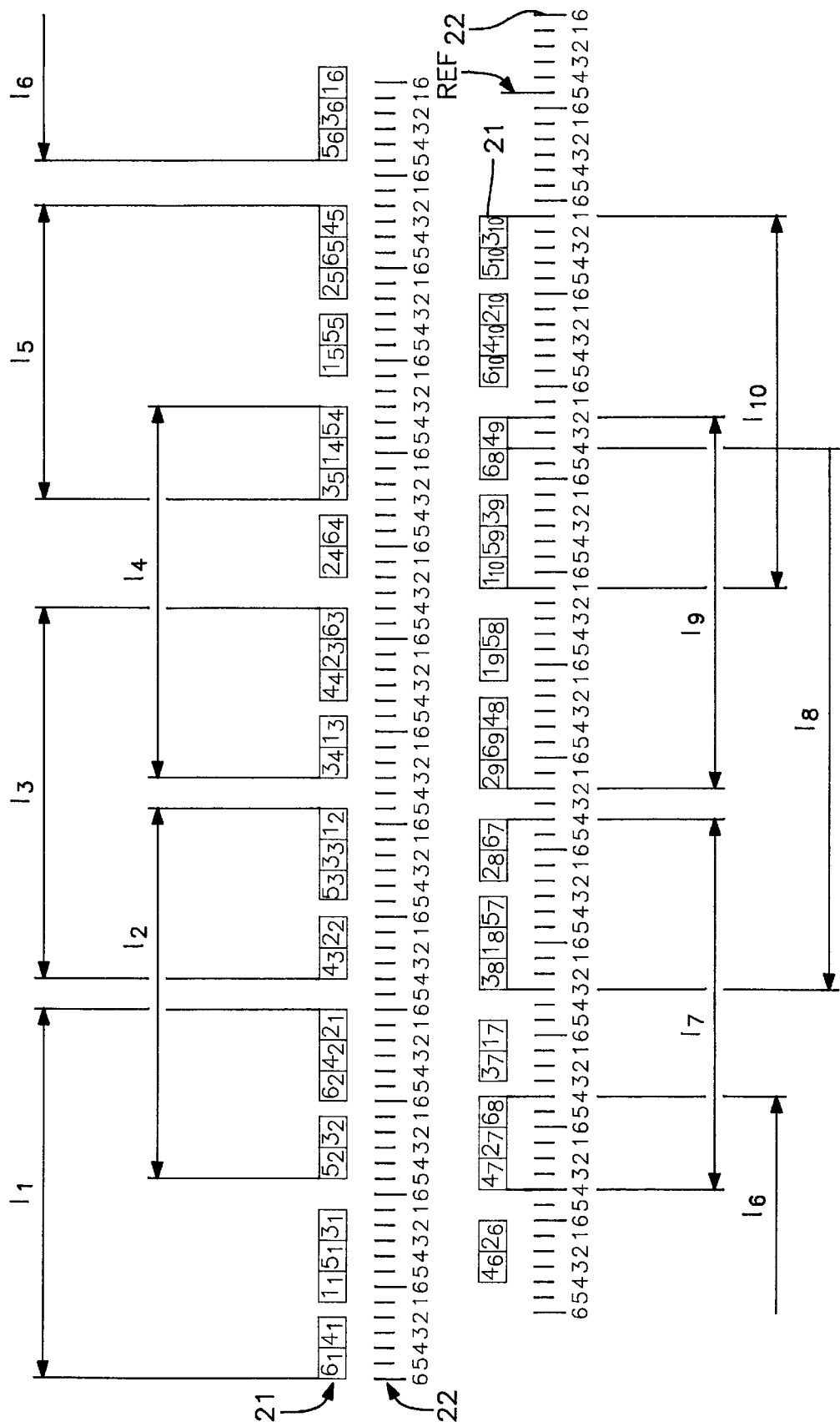

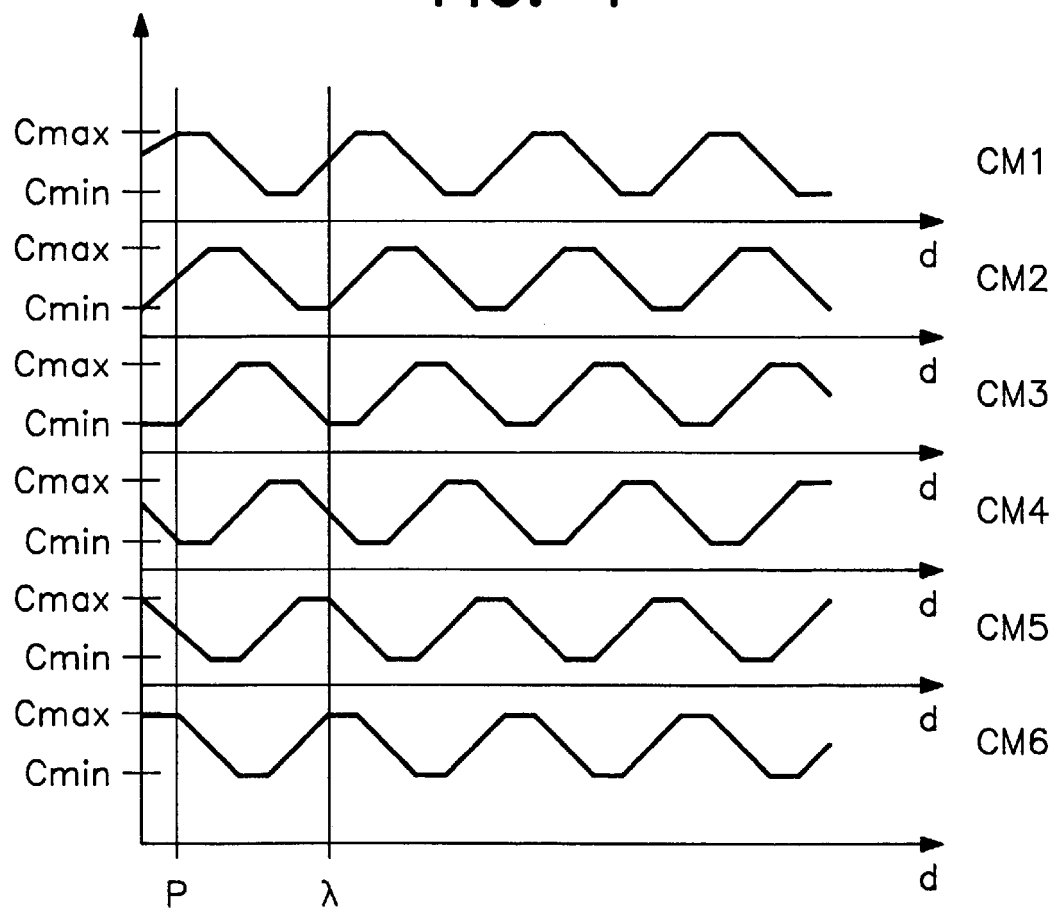

CAPACITIVE MEASURING DEVICE

BACKGROUND OF THE INVENTION

1. Field of the Invention

This invention concerns a capacitive measuring device. More specifically the invention relates to a capacitive measuring device comprising a scale provided with an array of scale electrodes and a transducer provided with an array of transducer electrodes, the two electrode arrays being coupled capacitively in such a way that electrical signals can be produced which depend upon the resulting coupling and thus the relative position of the transducer and the scale.

2. Description of the Related Art

Devices of this type are used, for example, in instruments for measuring length or angles such as sliding calipers, or measuring columns or gauges for angles. They have the advantage of precise electronic measurement and are more economical than optical measuring systems. The patents or patent applications JP-A-12455283; U.S. Pat. No. 4,878,013; EP 0 248 165; U.S. Pat. No. 5,225,830; JP 1841668; JP 1783036; U.S. Pat. No. 5,239,307; EP 0 413 922; EP 0 404 980 and EP 0 400 626, among others, describe examples of known devices.

Generally speaking, these devices comprise a scale formed by a printed circuit or a glass substrate on which the scale electrodes are disposed. The transducer is composed of a second printed circuit equipped with an array of transducer electrodes placed facing the scale electrodes. The scale electrodes and the transducer electrodes thus constitute two arrays of capacitors, mobile with respect to one another. The capacitive coupling between the transducer electrodes and the scale electrodes varies according to the relative position of the transducer with respect to the scale. This information is evaluated in order to display the position measurement.

In these devices, the precision of measurement attainable is limited by different factors such as geometrical imperfections of the transducer or of the scale, in particular inaccuracies in mutual placement, surface unevenness or irregularities, or by imprecise geometry of the transducer or scale electrodes. In particular, the transducer electrodes are generally made using known techniques for manufacturing printed circuits. It is difficult with these techniques to obtain a precision in the geometry of the electrodes which is compatible with the desired smallest measurable quantities. The scale suffers from similar problems, at least when it is produced from a printed circuit. Moroever mechanical errors, due, for example, to imprecise construction or to dilatation cause changes in the spacing between the transducer and scale electrodes, and thus variations of the measured capacitances difficult to foresee or correct. In the aforementioned patents, several ways of placing electrodes on the transducer and the scale have been envisaged which permit at least partial compensation of the different factors leading to errors and which increase the precision.

In the Swiss patent CH 648 929 (TESA), the transducer electrodes are divided into four groups (A1, A2, B1, B2), phase-shifted with respect to one another by 90°. Each group comprises three distinct electrodes, which allows certain errors to be distributed and averaged out at least partially.

However, in the aforementioned patent, all the electrodes in each electrode group are placed in the same corner of the transducer. In FIG. 1 of the patent, it is to be noted that all the electrodes of group A1 are placed in the upper left corner of the transducer, all those of group B2 in the lower left corner, and so on. This device is consequently very sensitive to errors in the positioning of the transducer opposite the scale and, in particular, in the pivoting of the transducer about its longitudinal axis.

In the European patent EP 0 404 980, for example, the transducer electrodes are equally distributed in four groups (1, 2, 3, 4) phase-shifted with respect to each other by 90°. In FIG. 4 of that patent, each group is composed of 5 distinct electrodes distributed more or less over the whole surface of the transducer in such a way that the groups are intermixed. The successive electrodes thus belong respectively to groups 1, 2, 3, 4, 1, 2, 3, 4, 1, 2, 3 and so on. An identical succession of electrodes thus repeats itself periodically.

The U.S. Pat. No. 4,878,013 (Andermo) also proposes various ways of disposing the electrodes on the transducer. In particular, FIGS. 3 to 5 of that patent illustrate different ways of distributing the electrodes on the transducer so as to distribute the electrodes of each group (1 to 6) more or less uniformly over the whole surface of the transducer. The different groups of electrodes are thus equally intermixed. On the transducer of FIG. 4 of this patent, the successive electrodes belong respectively to groups 1, 3, 5, 4, 6, 2, then the succession repeats itself periodically. In the case of a transducer having a large number of electrodes, for example more than 50, distributed into a fairly small number of groups, for example 6, the same succession of electrodes repeats itself several times. With the embodiments of FIGS. 2 and 4, the succession repeats itself certainly less often, but the frequency of patterns thus formed remains high.

Owing to the techniques used in particular to manufacture the scale, and especially the transducer, certain geometrical inaccuracies repeat themselves periodically. This is the case, for example, for certain errors in the positioning or surface variations of the electrodes caused by the printing technique used. When the frequency of repetition of these errors is in a whole number ratio to the frequency of repetition of patterns of electrodes on the transducer, the resulting errors on all the electrodes of a group can accumulate instead of be averaged out. The correct functioning of the device is thus not ensured.

Among other things, since the succession of electrodes on the transducer repeats itself, the electrodes of each group are found regularly placed next to electrodes of another same group. For example, in FIG. 4 of the aforementioned patent, the electrodes of group 3 are always found between those of group 1 and those of group 5. The crosstalk between the electrodes of group 3 and those of group 1 is thus much greater than the coupling between the electrodes of group 3 and those of group 6, for example. This results in functioning asymmetries which can give a false measurement reading.

The European published application with the publication number EP 0 537 800 (Mitutoyo) and the European patent EP 0 400 626 (Mitutoyo) describe a transducer in which the electrodes have a variable shape and surface. This configuration permits compensation of certain errors in parallelism and pivoting of the transducer. The specific problems connected with the periodicity of electrodes remain however. Moreover, the capacitive coupling obtained is limited by the size of the electrodes, certain ones being very small. Therefore, to obtain a coupling sufficient for measurement, it is necessary for the transducer to move at a very slight distance above the scale, which poses problems of production mechanics.

SUMMARY OF THE INVENTION

One object of the invention is thus to propose a capacitive measuring device comprising a scale provided with an array of scale electrodes spaced by a pitch (λ) and a transducer which can move opposite the said scale, the transducer being provided with an array of transducer electrodes, which measuring device does not have the aforementioned drawbacks.

Another object of the invention is to propose new rules for disposing electrodes adapted to different sizes and different types of electrodes, which permit limitation of the problems of crosstalk between groups of electrodes and the problems connected with manufacturing defects in the transducer and in the scale.

A further object is to obtain a sufficient capacitive coupling between the scale electrodes and the transducer electrodes.

According to the invention, these objects are attained with a capacitive measuring device comprising:
a scale provided with an array of scale electrodes spaced by a pitch (λ),
a transducer which can move opposite the said scale, the transducer being provided with an array of transducer electrodes,
and in which:
the possible initial positions at which the transducer electrodes can be placed are spaced one from the other by an elementary interval (P) obtained by dividing the pitch (λ) by N, N being an integer greater or equal to 2,
each transducer electrode has a group index corresponding to 1 plus the modulo number N of elementary intervals (P) between the initial position of this electrode and a reference position along the array of transducer electrodes,
the said transducer electrodes are divided into at least two sets of electrodes, one set of electrodes being defined as a collection of N electrodes having a different group index, each transducer electrode belonging to a single set,
each set of transducer electrodes is spread over a set interval ($I_j$) greater than the pitch (λ),
the different groups of electrodes consisting of transducer electrodes with the same group index are intermixed,
the capacitances formed between the scale electrodes and the transducer electrode groups depend upon the relative position of the transducer with respect to the scale,
the set intervals ($I_j$) occupied by the said successive sets of transducer electrodes interpenetrate in such a way that the different sets are intermixed.

In particular, these objects are attained based on new rules of placement according to the invention, in which the set intervals occupied by the successive sets of electrodes overlap at least partially in such a way that the different sets of electrodes are intermixed. A set of electrodes is defined as being composed of a collection with one—and just one—electrode from each group.

Owing to this feature, there is greater freedom in the placement of electrodes on the transducer than in the case where the sets do not overlap. It is thus possible to reduce considerably the periodicity of the electrodes, and to increase the entropy in the placement of the electrodes.

According to a further feature of the invention, the width of the transducer electrodes is greater than the spacing between the possible initial positions which the electrodes can take.

BRIEF DESCRIPTION OF THE DRAWINGS

The invention will now be explained in more detail, by way of example, with reference to the figures in which:

FIG. 3 shows a second example of placement of transducer electrodes according to the invention;

FIG. 4 shows the variation of capacitance on the different groups of electrodes as a function of the relative position of the transducer and the scale.

DESCRIPTION OF THE PREFERRED EMBODIMENTS

Figure 1:
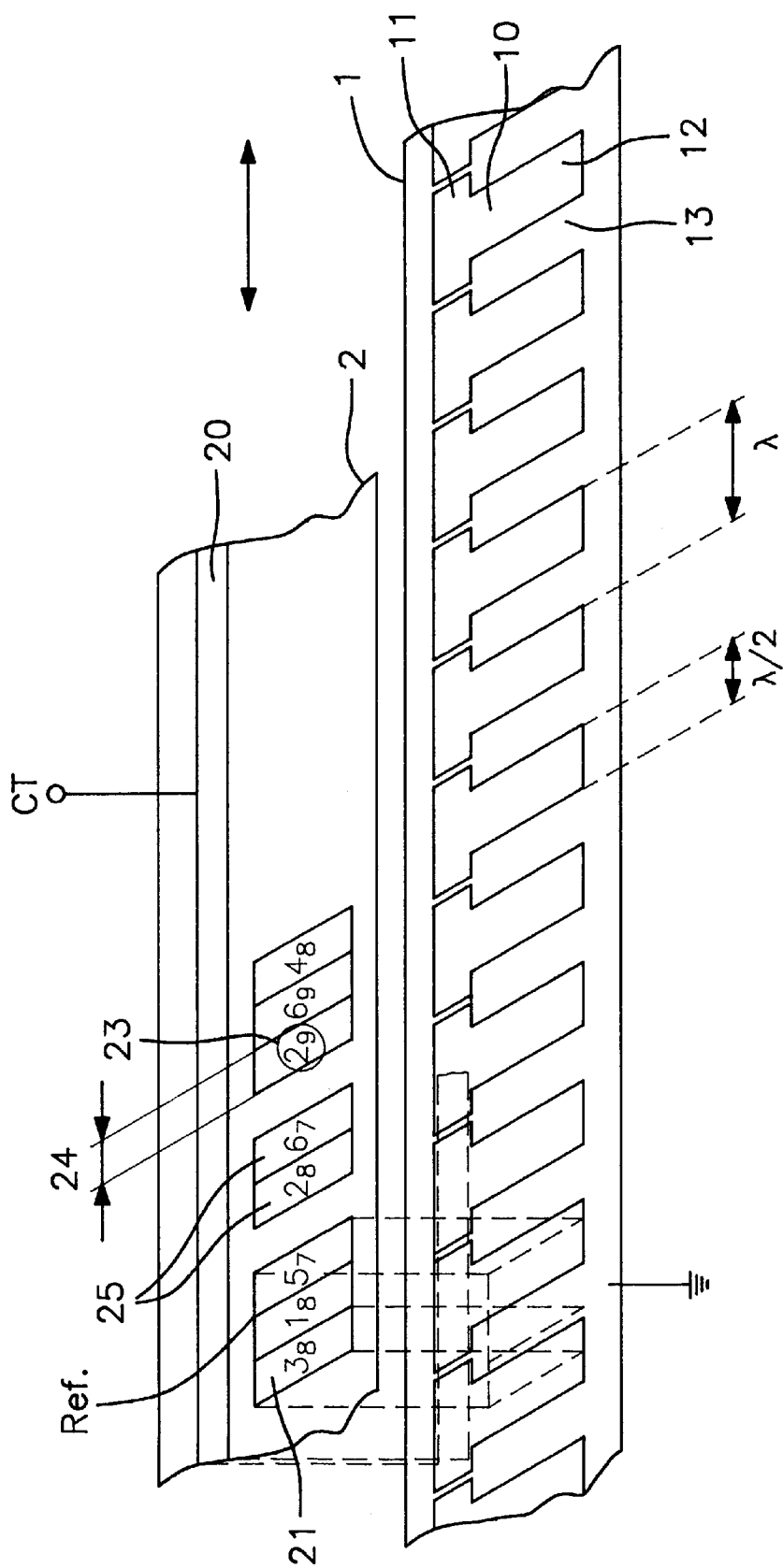
FIG. 1 is a diagrammatic view showing an example relative placement of the transducer and the scale.

The measuring device has a scale 1 shown in FIG. 1. It is preferably fixed with respect to the capacitive measuring device assembly, whereas the capacitive transducer 2 can be moved at a short distance above the scale. In the case where the measuring device comprises a measuring column or a sliding caliper, the scale 1 is integral with the frame or with the beam of the device whereas the transducer 2 is associated with the slide capable of sliding along the frame or the beam. The length of the transducer is typically on the order of some centimeters compared to several tens of centimeters for the scale. Other arrangements, in particular an inversion of the scale and the transducer, are also possible. In the case of a device for measuring angles or rotation of a shaft, the scale can comprise an array of electrodes on the periphery of a shaft, and the transducer placed on the inside of a cylindrical collar, as explained in the European patent EP 0 435 429 which is related to U.S. Pat. No. 5,239,307.

The scale is, for example, a scale of glass on which electrodes 10 are disposed by metallization. In a variant embodiment, the scale can also be made using printed circuit manufacturing technology. The transducer 2 is preferably made with a printed circuit board on which transducer electrodes are etched. Part of the processing electronics, not shown in the figures, can be placed directly on this board. In a variant embodiment, the transducer can be made using integrated circuit manufacturing technology, allowing production of very fine and very precise electrodes, but at a higher cost, however.

The scale electrodes 10 in the example embodiment shown in FIG. 1 have a T-shape, the top bar 11 of the T functioning as a receiving electrode and the stem or rod 12 of the T as transmitting electrode. The scale electrodes are insulated from one another. The part 13 of the scale between the scale electrodes 10, which is metallized while being insulated from electrodes 10, is connected to the ground. The scale electrodes 11 are spaced by a scale pitch λ. The width of the rod of the scale electrodes, i.e. the transmitting electrodes, is λ/2.

The transducer has an excitation electrode 20 to which a pulsed excitation signal CT is applied. This excitation electrode is placed facing the receiving scale electrodes 11, in such a way as to cover over a plurality of successive electrodes. The width of the excitation electrode is equal to, or slightly less than, the width 24 of the receiving scale electrodes. In this way the excitation signal CT is transmitted capacitively to receiving electrodes 11 under the transducer. The signal thus obtained is directly transmitted to rods 12 of the scale electrodes, which function as transmitting electrodes. These transmitting electrodes polarize in turn the transducer electrodes 21 placed above, on the transducer.

An inverted functioning of the measuring device is likewise possible, i.e. signals can be applied to the transducer electrodes 21 in such a way as to polarize the rods 12 of the scale electrodes, then the top bars 11, and to polarize subsequently the electrode 20 which functions then as a measuring electrode.

The placement of the transducer electrodes 21 according to the invention is not limited to this particular arrangement of the other electrodes on the transducer and on the scale. It is possible for example to do away with the excitation electrodes 20 and the receiving electrodes 11, and to apply the CT signal directly to the transmitting scale electrodes 12.

The signals obtained on the transducer electrodes 21 depend on capacitive coupling between the transmitting scale electrodes 12 and the transducer electrodes 21, and thus on the relative position of the transducer with respect to the scale. When the transducer moves, the signals obtained vary periodically.

According to its initial position, each transducer electrode 21 belongs to a predetermined group. The group index i of each electrode is determined as equalling 1 plus the distance modulo N between its initial position and a reference position REF along the array of transducer electrodes, N being an integer equal to the number of distinct groups. The transducer electrodes are moreover divided into at least two sets of electrodes, a set of electrodes being defined as a collection of minimal width, consisting of N electrodes each having a different group index such that each electrode belongs to one and only one set. In the figures each electrode is therefore referred to by a designation 23 of type $G_j$, G designating the group index of the electrode and j its set index. For example, the electrode 32 designates the electrode in the second set whose initial position belongs to group 3. A final remark about the terminology: the term bundle will designate in the following a collection 25 of directly adjacent electrodes, i.e. which are not separated by unoccupied possible initial positions.

Figure 2:
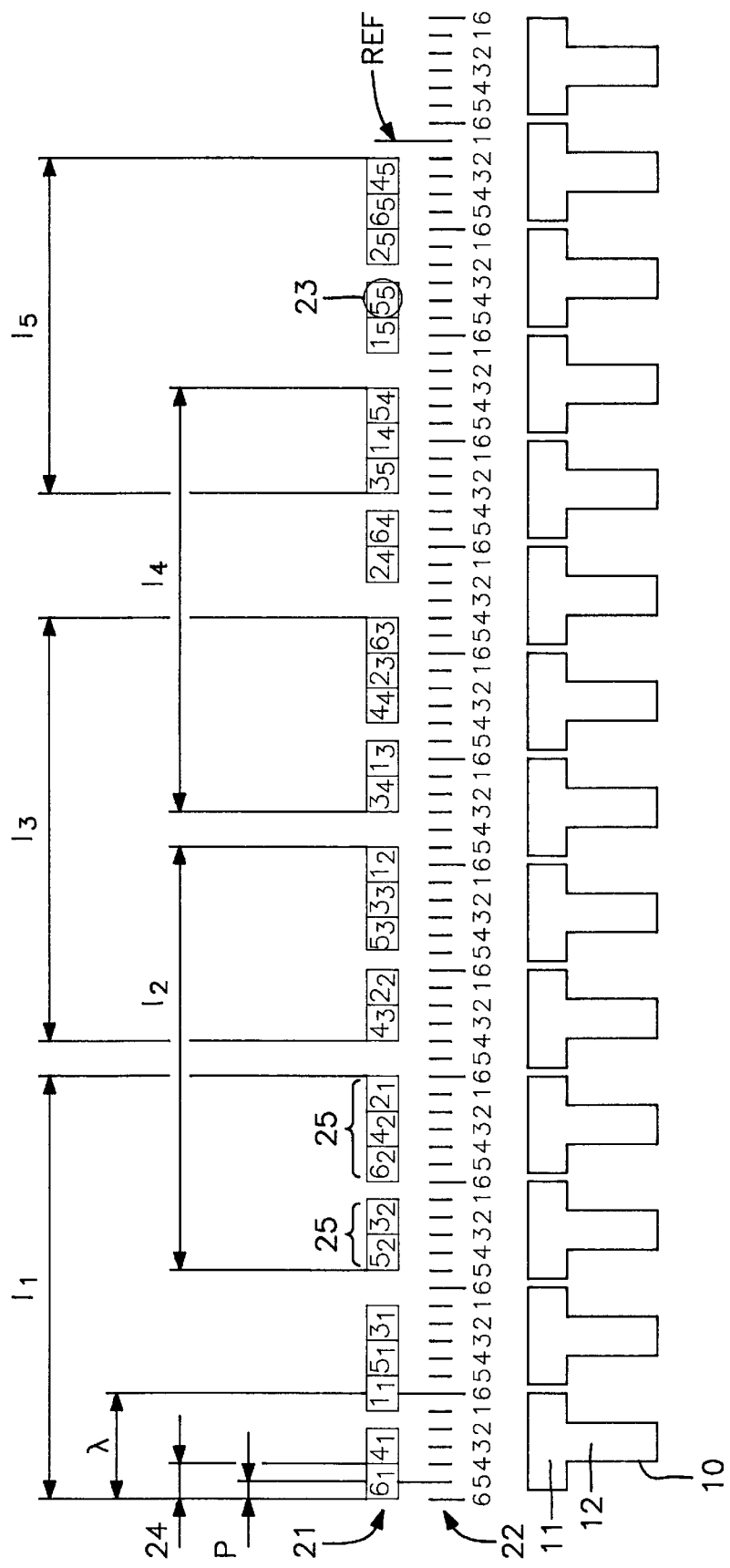
FIG. 2 shows a first example of placement of transducer electrodes according to the invention.

In the first example of electrode placement, depicted in FIG. 2, the transducer electrodes 21 are divided as shown into 5 sets of electrodes, each set consisting of N=6 electrodes. In the placement example of FIG. 3, the electrodes are divided into 10 sets of N=6 electrodes. N could of course have a value other than 6, for example 4, 8, 10 or 12. Other ways of dividing the electrodes into groups and sets are of course also possible. The invention applies also to devices in which the number of electrodes per group is variable.

The intervals occupied by the successive sets of transducer electrodes are illustrated in FIGS. 2 and 3 by arrows and are given the reference designations of type $I_j$, j having the value of the particular set index. It is to be noted that these intervals can be of constant width or not, depending on the embodiments.

The transducer electrodes occupy certain possible initial positions 22, defined from a reference position REF as being regularly spaced by an elementary interval P. The width of the elementary interval P is equal to the width of the scale pitch λ divided by N. Typically, the scale pitch λ equals a few millimeters and, if N equals 6, the width of the elementary interval P therefore equals a few tenths of a millimeter. The reference position REF can be chosen arbitrarily along the array of transducer electrodes.

According to one feature of this invention, the width 24 of the transducer electrodes 21 is greater than the width P of the elementary intervals between the possible initial positions 22. The capacitive coupling between the transmitting scale electrodes 12 and the transducer electrodes 21 is therefore improved with respect to the case where the width of the electrodes is equal to the width of the elementary interval P. The width 24 of the transducer electrodes 21 is preferably just less than double the width of the elementary interval P in such a way as to mutually insulate the electrodes. It is likewise possible to imagine configurations in which the width of the electrodes is not the same for all the electrodes. The length of the transducer electrodes 21 is equal to, or slightly less than, the length of the transmitting electrodes on the scale.

According to one feature of the invention, the transducer electrodes are placed according to an order having a very slight repetitiveness of the pattern constituted by the group indices of successive electrodes. The succession is thus non-periodic which allows compensating optimally the periodic defects or imprecision of the transducer 2 or of the scale. These periodic defects can, for example, be due to the limited resolution of the program or of the plotter used for manufacture of the transducer and of the scale. Furthermore, this non-periodic structure allows limitation of errors due to crosstalk between the electrodes of different groups.

In order to achieve greater freedom in placement of electrodes and thus reduce the periodicity, the set intervals $I_j$ occupied by the successive sets interpenetrate such that the different sets are intermixed. More precisely in FIG. 2, the succession of transducer electrodes 21 is $6_1$, $4_1$, $1_1$, $5_1$, $3_1$, then $5_2$, $3_2$, $6_2$, $4_2$, and $2_1$. The last electrode 21 of set 1 is separated from the other electrodes of the same et by four electrodes belonging to the set 2. It is to be noted that the sets of electrodes 1 and 2 interpenetrate, and that the depth of interpenetration is variable. Accordingly, as shown in FIGS. 1–3, the electrodes are intermixed so that at least some electrodes having a same group index are separated by electrodes having a same set index are separated by electrodes having a different set index.

This feature moreover permits spreading out of the intervals $I_j$ occupied by the successive sets of electrodes on larger widths. Since mechanical irregularities generally have a low frequency, their compensation can thus be improved.

To achieve a still greater choice in the placement of transducer electrodes, the number of unoccupied possible initial positions 22 between the different bundles of electrodes is preferably variable. In FIG. 2, for example, a single possible initial position is available between the bundles $\{6_1; 4_1\}$ and $\{1_1; 5_1; 3_1\}$, while two possible initial positions are available between the bundles $\{1_1; 5_1; 3_1\}$ and $\{5_2; 3_2\}$. In this way, the periodicity of the transducer electrodes 21 can be appreciably reduced and the entropy of the placement increased.

The number of transducer electrodes 21 in each group is identical so that the signals provided by each group of electrodes have as similar a form as possible. Another solution could be to have a variable number of electrodes per group, and thus certain sets which would be incomplete. It would then be necessary to compensate for the total surface of the electrodes which is not constant, by providing electrodes of variable size or adapted means in the processing electronics.

It is generally desirable that a large number of possible initial positions 22 for the transducer electrodes 21 are occupied in order to improve capacitive coupling. In the placement example shown in FIG. 2, the non-periodicity is optimal, and the number of electrodes per group constant, but the number of initial positions 22 remaining unoccupied is rather large. When the space available is sufficient on the transducer, for example in the case of transducers of large dimension intended for measuring columns, the capacitive coupling can be improved by adding supplementary sets of electrodes, as in the placement shown in FIG. 3.

It would be possible to increase the density of transducer electrodes 21 by adding electrodes between the bundles.

However, a structure again having a certain periodicity would be obtained, inferior nevertheless to that of most of prior art devices.

FIG. 4 shows the resulting variations of capacitances $CM_i$ between the transmitting scale electrodes 12 and the different groups of electrodes when the transducer 2 moves opposite the scale 1, in the example with N=6. The capacitance $CM_1$ corresponds to the capacitance resulting between the transmitting electrodes 12 and all the electrodes of group $X_1$, the capacitance $CM_2$ corresponds to the capacitance resulting between the transmitting electrodes 12 and all the electrodes of group $X_2$, and so on. The capacitances $CM_1$ vary periodically between $C_{max}$ and $C_{min}$. The capacitance $C_{max}$ corresponds to the situation in which the transducer electrodes 21 of the group considered cover over the scale electrodes 12 without lateral overlap, for example to the capacity corresponding to group $X_5$ in the position of the transducer illustrated by FIG. 1. The capacitance $C_{min}$ corresponds to stray capacitances when the electrodes are not entirely covered over, for example corresponding to the capacitance for the group $X_1$ in the position of the transducer illustrated by FIG. 1. In practice, one can approximate that $C_{min}$ is equal to zero. The period of variation is equal to the scale pitch $\lambda$. The phase shift between the capacitances corresponding to different groups is equal to 360°/N, that is 60° in the example with N=6. This phase shift corresponds to the width of the elementary interval P between the possible initial positions 22 for the transducer electrodes 21. It is thus possible to obtain a lower definition than that defined by the scale pitch $\lambda$.

Two main types of measuring circuits can be used to determine the position of the transducer 2 with respect to the scale 1. The first type, described for example in the aforementioned Swiss patent CH 648929, is of single injection and multiple reception. The principle consists in injecting a single excitation signal CT to the excitation electrode 20 of the transducer 2 and of measuring the signals received by the N different groups of transducer electrodes 21. The resulting N capacitances $CM_i$ at each instant are then measured, for example by capacitance bridge balance, and permit determination of the position of the transducer.

The second type, described for example in the European application 94105586.5 or in the European patents EP 0 184 584 and EP 0 053 091, is of multiple injection and single reception. The general principle consists in injecting N different signals, for example phase shifted with respect to one another, on the N groups of electrodes of transducer 21 and in measuring the signal received on the electrode 20, then functioning as a receiving electrode. Depending upon the form and the type of signals injected, generally the phase, the amplitude or the variation in frequency of the signals received is used as information in determining the position of the transducer 2 with respect to the scale 1. A known way to reduce external perturbation is to modulate the N signals before applying them to the electrodes and to demodulate the signal received on the electrode 20. With the second type a double receiving electrode 20 is frequently provided on the transducer, and to adapt the arrangement of the scale electrodes 10 in such a way so as to obtain signals shifted by 180° on the two receiving electrodes.

It is to be understood that other types of measuring circuits can be used which make use of the advantages of placement of transducer electrodes 20 according to the invention. Depending upon the type of circuit, the arrangement, form and functioning of the electrodes on the transducer and the scale can vary considerably with respect to the example illustrated by FIG. 1.

The description and the figures relate essentially to the case of a device for measuring length, such as a sliding caliper or a height gauge. The invention, however, is easily applicable to other types of capacitive measuring devices, such as devices for measuring angles, angular position, linear speed, angular speed, etc.

What is claimed is:

1. A capacitive measuring device comprising:

a scale provided with an array of scale electrodes spaced by a pitch ($\lambda$), a transducer which can move opposite the said scale, the transducer being provided with an array of transducer electrodes, and in which:

the possible initial positions at which the transducer electrodes can be placed are spaced one from the other by an elementary interval (P) obtained by dividing the pitch ($\lambda$) by N, N being an integer greater than or equal to 2, each transducer electrode belonging to a group having a group index, the group index corresponding to 1 plus the modulo number N of elementary intervals (P) between the initial position of this electrode and a reference position along the array of transducer electrodes, the said transducer electrodes are divided into at least two sets of electrodes, each set of electrodes being defined as a collection of N electrodes having a different group index, each transducer electrode belonging to a single set having a set index, at least two transducer electrodes with a same group index are separated by at least one electrode with a different group index, the capacitances formed between the scale electrodes and the transducer electrode groups depend upon the relative position of the transducer with respect to the scale, at least two transducer electrodes with a same set index are separated by at least one electrode with an adjacent set index.

2. The capacitive measuring device of claim 1, wherein the width of the transducer electrodes is greater than the width of the said elementary intervals between the possible initial positions.

3. The capacitive measuring device of claim 1, wherein the succession of group indices within different sets of transducer electrodes is different.

4. The capacitive measuring device of claim 1, wherein the depth of mutual interpenetration of different sets is variable.

5. The capacitive measuring device of claim 1, wherein the transducer electrodes are divided in bundles, each bundle comprising an electrode or several directly adjacent electrodes, the number of unoccupied possible initial positions between the different bundles being variable.

6. The capacitive measuring device of claim 5, wherein the width of the transducer electrodes is greater than the width of the said elementary intervals between the possible initial positions.

7. The capacitive measuring device of claim 5, wherein the succession of group indices within different sets of transducer electrodes is different.

8. The capacitive measuring device of claim 7, wherein the depth of mutual interpenetration of different sets is variable.

9. The capacitive measuring device of claim 5, wherein the number of electrodes per bundle is variable.

10. The capacitive measuring device of claim 1, wherein each scale electrode includes a part placed facing transducer electrodes which functions as a transmission electrode, the width of this part functioning as a transmission electrode equalling approximately half ($\lambda/2$) the pitch of the scale ($\lambda$).

11. The capacitive measuring device of claim 1, wherein the transducer is additionally equipped with at least one excitation electrode, each scale electrode comprising a part placed facing the excitation electrode or electrodes of the transducer which functions as a receiving electrode in such a way that the excitation electrode or electrodes of the transducer can polarize at least a part of the scale electrodes with an excitation signal (CT).

12. The capacitive measuring device of claim 1, wherein the transducer is additionally equipped with at least one receiving electrode, the device functioning according to the principle of multiple injection of different signals on the scale electrodes and of simple reception on at least one receiving electrode.

13. A capacitive measuring device comprising:
   a scale provided with an array of scale electrodes spaced by a pitch ($\lambda$),
   a transducer which can move facing the said scale, the transducer being provided with an array of transducer electrodes,
   and in which:
      the possible initial positions at which the transducer electrodes can be placed are spaced one from the other by an elementary interval (P) obtained by dividing the pitch ($\lambda$) by N, N being an integer greater than or equal to 2,
      the width of transducer electrodes being greater than the width of the said elementary intervals (P) between the possible initial positions,
      the transducer electrodes being divided in bundles, each bundle comprising an electrode or several directly adjacent electrodes, the number of unoccupied possible initial positions between the different bundles being variable,
      each transducer electrode belonging to a group having a group index, the group index corresponding to 1 plus the modulo number N of elementary intervals (P) between the initial position of this electrode and a reference position along the array of transducer electrodes,
      the said transducer electrodes are divided into at least two sets of electrodes, one set of electrodes being defined as a collection of N electrodes having a different group index, each transducer electrode belonging to a single set having a set index,
      at least two transducer electrodes with a same group index are separated by at least one electrode with a different group index,
      the capacitances formed between the electrodes of the scale and the transducer electrode groups depend upon the relative position of the transducer with respect to the scale,
      at least two transducer electrodes with a same set index are separated by at least one electrode with a different set index,
      the electrodes of at least two sets are in different sequential orders of group indices,
      the depth of mutual interpenetration of different sets being variable.

14. The capacitive measuring device of claim 13, wherein each scale electrode comprises a part placed facing transducer electrodes which functions as a transmission electrode, the width of this part functioning as a transmission electrode equalling approximately half ($\lambda/2$) of the pitch ($\lambda$).

15. The capacitive measuring device of claim 13, wherein the transducer is additionally equipped with at least one excitation electrode, each scale electrode comprising a part placed facing the excitation electrode or electrodes of the transducer which functions as a receiving electrode in such a way that the excitation electrode or electrodes of the transducer can polarize at least a part of the scale electrodes with an excitation signal.

16. The capacitive measuring device of claim 13, wherein the transducer is additionally equipped with at least one receiving electrode, the device functioning according to the principle of multiple injection of different signals on the scale electrodes and of simple reception on at least one receiving electrode.

17. A capacitive measuring device comprising:
   a scale provided with an array of scale electrodes spaced by a pitch ($\lambda$),
   a transducer which can move opposite the said scale, the transducer being provided with an array of transducer electrodes,
   and in which:
      the possible initial positions at which the transducer electrodes can be placed are spaced one from the other by an elementary interval (P) obtained by dividing the pitch ($\lambda$) by N, N being an integer greater than or equal to 2,
      each transducer electrode belonging to a group having a group index, the group index corresponding to 1 plus the modulo number N of elementary intervals (P) between the initial position of this electrode and a reference position along the array of transducer electrodes,
      the said transducer electrodes are divided into at least two sets of electrodes, each set of electrodes being defined as a collection of N electrodes having a different group index, each transducer electrode belonging to a single set having a set index,
      at least two transducer electrodes with a same group index are separated by at least one electrode with a different group index,
      the capacitances formed between the scale electrodes and the transducer electrode groups depend upon the relative position of the transducer with respect to the scale,
      the electrodes of at least two sets are in different sequential order of group indices.

18. The capacitive measuring device of claim 1, wherein the at least one electrode with an adjacent set index comprises an electrode from a non-adjacent set that is moved to a position adjacent said at least two electrodes.

19. The capacitive measuring device of claim 13, wherein the at least one electrode with a different set index comprises an electrode with an adjacent set index.

20. The capacitive measuring device of claim 19, wherein the at least one electrode with an adjacent set index comprises an electrode from a non-adjacent set that is moved to a position adjacent said at least two electrodes.

21. The capacitive measuring device of claim 17, wherein the at least one electrode with an adjacent set index comprises an electrode from a non-adjacent set that is moved to a position adjacent said at least two electrodes.

* * * * *